US010118797B2

(12) United States Patent
Keser (10) Patent No.: US 10,118,797 B2
(45) Date of Patent: Nov. 6, 2018

(54) MOBILE APPLICATION BASED ELEVATOR DISPATCHING USING TENANT IDENTITY

(71) Applicant: OTIS ELEVATOR COMPANY, Farmington, CT (US)

(72) Inventor: Adam Keser, Burlington, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 382 days.

(21) Appl. No.: 14/891,742

(22) PCT Filed: May 20, 2013

(86) PCT No.: PCT/US2013/041758
§ 371 (c)(1),
(2) Date: Nov. 17, 2015

(87) PCT Pub. No.: WO2016/010508
PCT Pub. Date: Jan. 21, 2016

(65) Prior Publication Data
US 2016/0122157 A1 May 5, 2016

(51) Int. Cl.
*B66B 1/34* (2006.01)
*B66B 1/46* (2006.01)
(Continued)

(52) U.S. Cl.
CPC .......... *B66B 1/468* (2013.01); *H04W 4/023* (2013.01); *H04W 4/043* (2013.01); *B66B 2201/243* (2013.01); *B66B 2201/4653* (2013.01)

(58) Field of Classification Search
CPC .............. B66B 1/468; B66B 2201/243; B66B 2201/4653; H04W 4/023; H04W 4/043
(Continued)

(56) References Cited

U.S. PATENT DOCUMENTS 5,984,051 A * 11/1999 Morgan ................. B66B 1/468
187/316
6,202,799 B1 * 3/2001 Drop ....................... B66B 1/468
187/384
(Continued)

FOREIGN PATENT DOCUMENTS

| CN | 1976855 A | 6/2007 |
| CN | 102811935 A | 12/2012 |

(Continued)

OTHER PUBLICATIONS

International Search Report and Written Opinion for application PCT/US2013/041758, dated Feb. 25, 2016, 11 pages.
(Continued)

*Primary Examiner* — Anthony Salata
(74) *Attorney, Agent, or Firm* — Cantor Colburn LLP (57) ABSTRACT

A method includes receiving, by a computing device comprising a processor, registration information associated with a tenant of a building and at least one user device, determining, by the computing device, that the at least one user device is within a threshold distance of the building, causing, by the computing device, an identity of the tenant to be provided by the at least one user device based on the determination that the at least one user device is within the threshold distance of the building, and causing, by the computing device, an elevator car to be dispatched to a floor of the building on which the tenant is located.

13 Claims, 3 Drawing Sheets

(51) Int. Cl.
*H04W 4/04* (2009.01)
*H04W 4/02* (2018.01)

(58) Field of Classification Search
USPC .................... 187/247, 380–388, 391–393
See application file for complete search history.

(56) References Cited

U.S. PATENT DOCUMENTS

| | | | | |
|---|---|---|---|---|
| 6,382,363 | B1* | 5/2002 | Friedli | B66B 1/468 |
| | | | | 187/384 |
| 6,397,976 | B1* | 6/2002 | Hale | B66B 1/468 |
| | | | | 187/384 |
| 6,868,945 | B2* | 3/2005 | Schuster | B66B 1/468 |
| | | | | 187/380 |
| 8,061,485 | B2* | 11/2011 | Finschi | B66B 1/468 |
| | | | | 187/384 |
| 8,151,942 | B2 | 4/2012 | Rusanen et al. | |
| 8,380,434 | B2 | 2/2013 | Suzuki et al. | |
| 8,573,366 | B2* | 11/2013 | Elomaa | B66B 1/2458 |
| | | | | 187/387 |
| 8,584,810 | B2* | 11/2013 | Tokura | B66B 1/2458 |
| | | | | 187/382 |
| 8,960,373 | B2* | 2/2015 | De Vincentis | B66B 1/2408 |
| | | | | 187/381 |
| 9,284,158 | B2* | 3/2016 | Sarjanen | B66B 1/468 |
| 9,323,232 | B2* | 4/2016 | Blom | G05B 13/00 |
| 9,469,500 | B2* | 10/2016 | Friedli | B66B 1/2408 |
| 2007/0151809 | A1 | 7/2007 | Tyni et al. | |
| 2008/0026774 | A1 | 1/2008 | Fraccaroli | |
| 2009/0020370 | A1 | 1/2009 | Boss et al. | |
| 2009/0294221 | A1 | 12/2009 | Bahjat et al. | |
| 2012/0252498 | A1 | 10/2012 | Trinchero et al. | |
| 2012/0318617 | A1 | 12/2012 | Sarjanen | |
| 2016/0251198 | A1* | 9/2016 | Salmikuukka | B66B 1/2458 |
| | | | | 187/388 |

FOREIGN PATENT DOCUMENTS

| | | |
|---|---|---|
| EP | 0508438 A1 | 10/1992 |
| KR | 100991477 B1 | 11/2010 |

OTHER PUBLICATIONS

CampusView, "Campus View—Intelligent Supervision—Computerized Elevator Control Corp.", available at http://www.sriftcec.com/profucts/campusview.html, accessed at Mar. 19, 2013, 4 pages.
Kaplan, Melanie D.G., "Intelligent elevators answer vertical challenges", Smart Planet, Special Feature—The Intelligence Issue, Jul. 17, 2012, 5 pages.
Software House, a Tyco International Company, "ThyssenKrupp Destination Dispatch Elevator System", available at http://www.swhouse.com/products/thyssenKrupp-destination-dispatch-system.aspx, 2013, 1 page.
Wikipedia article, "GSM (Global System for Mobile Communications, originally Groupe Special Mobile)", available at http://en/wikipedia.org.wiki/GSM, accessed Mar. 19, 2013, 10 pages.
Extended EP Search Report for application EP 13900869.2, dated Jan. 16, 2017, 7 pgs.
Chinese Office Action and Search for application 201380078352.2, dated Dec. 7, 2017, 11 pgs.

\* cited by examiner

| Floor # | Access |
|---|---|
| 1 | All |
| 2 | User ID#s: #, #, # |
| 3 | Security Access Level |
| 4 | User ID#s: #, #, # |

MOBILE APPLICATION BASED ELEVATOR DISPATCHING USING TENANT IDENTITY

BACKGROUND

Currently, traffic (e.g., foot traffic) in a building, such as an office building, may be regulated on the basis of user credentials. For example, a person may carry a card or the like that can be swiped or presented to an access terminal. In some instances, the card may serve a dual-purpose, such as an employee identification badge. The person may be provided access to a resource (e.g., an elevator car, a floor of the building, entrance to a space (e.g., an office) within the building, etc.) if the person is authorized to access the resource.

When a person enters a building, they may request access to, e.g., an elevator by depressing a button on a hall box located in an elevator lobby. The depression of the button may serve to call an elevator car to the lobby floor to transport the person to destination floor, which may be selected by the user once the user enters the elevator car.

BRIEF SUMMARY

An embodiment is directed to a method comprising: receiving, by a computing device comprising a processor, registration information associated with a tenant of a building and at least one user device, determining, by the computing device, that the at least one user device is within a threshold distance of the building, causing, by the computing device, an identity of the tenant to be provided by the at least one user device based on the determination that the at least one user device is within the threshold distance of the building, and causing, by the computing device, an elevator car to be dispatched to a floor of the building on which the tenant is located.

An embodiment is directed to an apparatus comprising: at least one processor, and memory having instructions stored thereon that, when executed by the at least one processor, cause the apparatus to: communicate with a mobile device based on the mobile device being located within a threshold distance of a building, and transmit to the mobile device an indication of an elevator car to be dispatched to a tenant within the building based on the communication with the mobile device.

An embodiment is directed to a system comprising: at least one computing device configured to: determine when a user device included in a plurality of user devices is within a threshold distance of at least one building included in a plurality of buildings, cause identities of one or more tenants registered with a service provider within the at least one building to be provided to the user device based on determining that the user device is within the threshold distance, and cause an elevator car to be dispatched to a floor of the at least one building on which at least one tenant of the registered one or more tenants is located.

An embodiment is directed to an elevator dispatching system comprising: an elevator dispatching unit configured to dispatch a plurality of elevator cars in at least one building, a memory configured to store information regarding, a plurality of users, and a plurality of tenants in the at least one building, wherein the dispatching unit is configured to, by way of a mobile device, determine that a one of the plurality of users is proximate to the at least one building, determine a one of the plurality of tenants that is a destination of the one of the plurality of users, dispatch a one of the plurality of elevator cars to transport the one of the plurality of users to the destination, and inform the one of the plurality of users, by way of the mobile device, that the dispatched one of the plurality of elevator cars should be used.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection. Indirect connections, by way of non-limiting example, may include connections through a distributed computer network, the cloud, wireless communication networks, etc.

Exemplary embodiments of apparatuses, systems, and methods are described for dispatching an elevator. In some embodiments, the dispatching may be based on the use of a mobile device. Information relating to the use of the elevator may be communicated between the mobile device and one or more other entities, such as one or more computing devices or servers.

Figure 1:
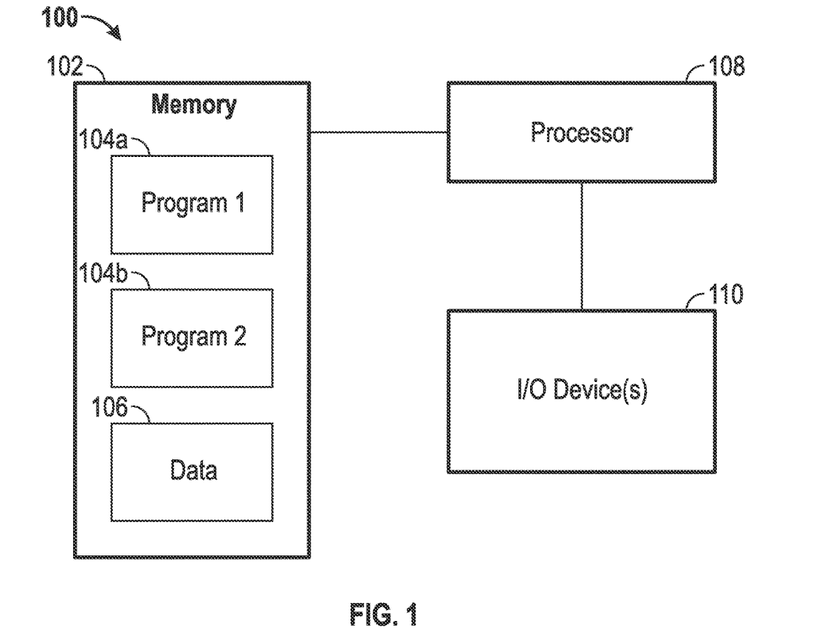
FIG. 1 is a schematic block diagram illustrating an exemplary computing system in accordance with one or more aspects of this disclosure.

Referring to FIG. 1, an exemplary computing system 100 is shown. The system 100 is shown as including a memory 102. Memory 102 may be realized in any conventional form (optical, solid state, magnetic, etc.) or in forms yet to be developed. The memory 102 may store executable instructions. The executable instructions may be stored or organized in any manner and at any level of abstraction, such as in connection with one or more applications, processes, routines, procedures, methods, etc. As an example, at least a portion of the instructions are shown in FIG. 1 as being associated with a first program 104a and a second program 104b. Programs 104a/104b may be embodied in any known form (software, firmware, hardware, etc.) or in any form yet to be developed.

The memory 102 may store data 106. The data 106 may include registration data, tenant data, elevator car data, or any other type of data.

The instructions stored in the memory 102 may be executed by one or more processors, such as a processor 108. The processor 108 may be operative on the data 106. The type of processor 108 that may be used may include at least a part of a general purpose computer programmed to perform various processes, and a part of a specific purpose computer designed to perform the desired functions.

The processor 108 may be coupled to one or more input/output (I/O) devices 110. In some embodiments, the I/O device(s) 110 may include one or more of a keyboard or keypad, a touchscreen or touch panel, a display screen, a microphone, a speaker, a mouse, a button, a remote control, a joystick, a printer, a telephone or mobile device (e.g., a smartphone), etc. The I/O device(s) 110 may be configured to provide an interface to allow a user to interact with the system 100.

The system 100 is illustrative. In some embodiments, one or more of the entities may be optional. In some embodiments, additional entities not shown may be included. For example, in some embodiments the system 100 may be associated with one or more networks, such as one or more computer or telephone networks. In some embodiments, the entities may be arranged or organized in a manner different from that shown in FIG. 1.

Figure 2:
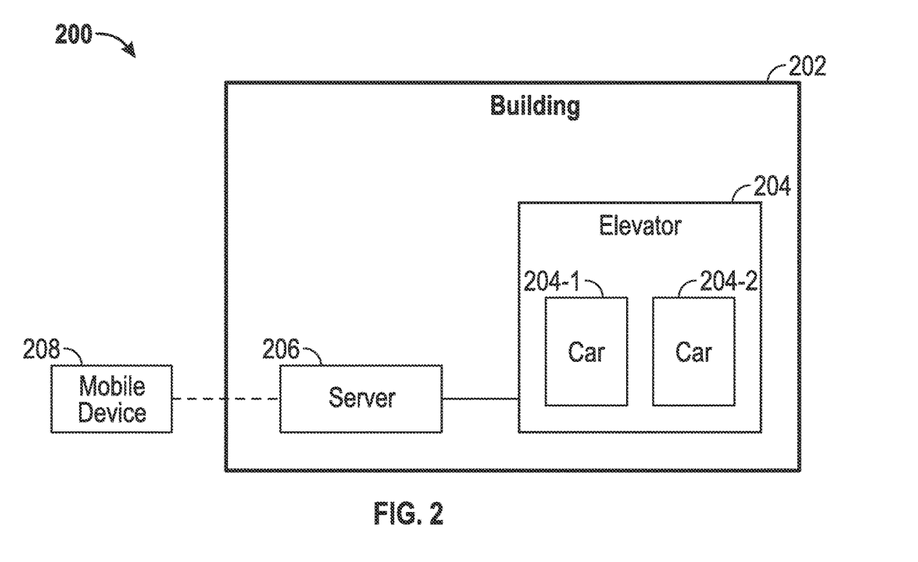
FIG. 2 illustrates an exemplary block diagram in accordance with one or more embodiments.

Turning now to FIG. 2, an exemplary block diagram 200 in accordance with one or more embodiments is shown. The block diagram 200 is shown as including a building 202. In some embodiments, the building 202 may be an office building or a collection of office buildings that may or may not be physically located near each other. The building 202 may include a number of floors. Persons entering the building 202 may enter at a lobby floor, and may go to a destination floor via one or more conveyance devices, such as an elevator 204.

The elevator 204 may be coupled to one or more computing devices, such as a server 206. The server 206 may be configured to control dispatching operations for one or more elevator cars (e.g., cars 204-1, 204-2) associated with the elevator 204. The elevator 204 may therefore refer to an elevator system including a plurality of elevator cars. The elevator cars may be located in the same hoistway or in different hoistways so as to allow coordination amongst elevator cars in different elevator banks serving different floors.

Also shown in the block diagram 200 is a mobile device 208. The mobile device 208 may include a type of device that is typically carried by a person, such as a phone. The mobile device 208 and the server 206 may communicate with one another. For example, the mobile device 208 and the server 206 may communicate with one another when proximate to (e.g., within a threshold distance of) one another. In some embodiments, the server 206 may include, or be associated with (e.g., communicatively coupled to) a kiosk. The kiosk may communicate with the mobile device 208 using one or more communication protocols or standards. For example, the kiosk may communicate with the mobile device 208 using near field communications (NFC). In other embodiments, the server 206 may establish communication with a mobile device 208 that is outside of the building 202. This connection may be established with various technologies including GPS, triangulation, or signal strength detection, by way of non-limiting example. Such technologies that allow early communication will provide users and the systems more time to establish the most efficient passenger flow, and may eliminate the need for a user to stop moving to interact with the system.

In some embodiments, one or both of the server 206 and the mobile device 208 may include one or more of the components/devices described above with respect to FIG. 1.

In some embodiments, a person associated with (e.g., an owner or user of) the mobile device 208 may register the mobile device 208 with a service (e.g., an application driven service) associated with the elevator 204 or building 202. The registration information may include, e.g., information related to the person's home, office, telephone number, favorite places, etc. The user can choose to have the service update the information based on usage data. For example, the usage data may include frequently visited floors within the building 202, or even frequently visited buildings 202 (e.g., when more than one building 202 is associated with the service).

In some embodiments, the building 202 may register with the service. The building 202's registration information may include, e.g., its entire directory, such as tenants, floor numbers, office number, telephone number associated with each tenant, web sites linked with each tenant, etc.

The mobile device 208 may be connected to the building 202's (registration) information. For example, when a user of the mobile device 208 is proximate to or enters the building 202, the user's location may be detected via a location tracking system (e.g., GPS coordinates). Based on such a detection, the server 206 may send information pertaining to the building 202 to the mobile device 208 using one or more communication techniques (e.g., via telephone communications, using the building 202's Wi-Fi, etc.). For example, the server 206 may send an identification of one or more tenants located within the building 202 to the mobile device 208. The mobile device 208 may allow the user to select a particular tenant. The selection of the tenant may be conveyed from the mobile device 208 to the server 206. The server 206 may initiate an elevator call and transmit to the mobile device 208 an indication of which elevator 204 or elevator car 204-1, 204-2 the user should report to when more than one elevator 204 or elevator car 204-1, 204-2 is present within the building 202.

In some embodiments, an identification of one or more tenants might not be sent to the mobile device 208. For example, privacy or security considerations might dictate not sending an identification of a particular tenant to the mobile device 208.

In some embodiments, a user interface may be adjusted to accommodate a "tenant-driven" interface. For example, if Dr. Smith is a tenant of the building 202 and Dr. Smith's office is located on the fourth floor of the building 202, and if the user of the mobile device 208 has an appointment with Dr. Smith, the user may indicate on the mobile device 208 that he is within the building 202 to visit Dr. Smith. When the user enters the assigned elevator 204 or elevator car 204-1, 204-2, an I/O device (e.g., a display device) associated with the mobile device 208 and/or within the elevator 204/elevator car 204-1, 204-2 may indicate that the user is being taken to Dr. Smith's office. Thus, the user might not need to know, or even care, that Dr. Smith's office is located on the fourth floor. In a further embodiment, the system may automatically synchronize with a scheduler resident on the mobile device 208. Accordingly, when a user having an appointment with Dr. Smith approaches the building 202 in which Dr. Smith's office is located, the system may determine that the user has an appointment with Dr. Smith, initiate an elevator call to bring the user to Dr. Smith's office, instruct the user to enter a specific elevator car, and inform Dr. Smith's office that the particular user is on her way. The system may even provide an estimated arrival time to Dr. Smith's office and/or the user.

In some embodiments, a determination may be made when users assigned to an elevator car 204-1, 204-2 have entered the elevator car. Such a determination may be used to avoid prematurely closing the doors to the elevator car prior to the users having entered the elevator car. The determination may be performed using proximity sensing technology.

In some embodiments, a timeout feature may be implemented to avoid keeping an elevator car at a particular floor for longer than a threshold amount of time if, for example, a user that requested access to an elevator car subsequently determines not to get in the elevator car once the elevator car arrives. If the timeout expires, the elevator car might not go to, or might not stop at, the destination floor associated with the user's request, thereby canceling the user's request.

In some embodiments, an accommodation may be made for a user of a mobile device entering an improper elevator car. For example, if a user of the mobile device 208 is in the building 202 to visit Dr. Smith, and if the server 206 initially assigns the user to elevator car 204-1, and if the user instead enters elevator car 204-2, the server 206 may adjust for such an event by reassigning the user to elevator car 204-2. Dispatching within the elevator 204 may be adjusted to accommodate for the reassignment.

In some embodiments, a dynamic assignment of elevator cars may be based on selections made by users or occupants within the elevator cars. For example, a user may identify her destination on a mobile device 208 and board whatever elevator or elevator car is available. The service may then dispatch the elevator car based on an identification of the users within the car.

According to various embodiments, the system may also prompt a user when a desired destination floor is reached. For example the system may cause a user's mobile device 208 to vibrate or produce an audible sound when the elevator car has reached, or is about to reach, the desired floor. This may improve traffic flow.

In some embodiments, priority or access rights may be assigned to users. For example, when the owner of the building 202 enters the building 202, the service can ensure that the owner is the only person assigned to an elevator car (e.g., car 204-1) and that the elevator car travels directly to the owner's chosen destination.

In some embodiments, tenant locations or floors within the building 202 may be secured, such that people may generally be unaware that such tenants are located within the building. For example, access to a particular tenant or floor may be conditioned on only those users that have appropriate access rights being allowed in an elevator car that stops at that tenant/floor. Any additional people entering the elevator car may be directed to exit the elevator car or the elevator car may drop off all the additional people before stopping at the secured tenant/floor. In such embodiments, the elevator 204 may only stop at certain floors after determining that only users with access to the floor are present in the elevator car. Techniques such as load weighing or video analysis may be used to assist in determining if only authorized users are present.

In some embodiments, tenants presented to a user by the mobile device 208 may be based on user preferences. For example, a user history may be accessed such that those tenants that the user has frequently or previously visited in an amount greater than a threshold (in absolute terms or in relative terms) within the building 202, or optionally within any of the buildings in the system, are displayed first or at the top of a listing. Tenants providing goods or services within the building 202 similar to goods/services previously consumed by the user (potentially at locations outside of the building 202) may similarly be prioritized or receive greater weight. Other schemes (e.g., alphabetical, by specialty, etc.) may be used to determine how to present the tenants located within the building 202 on the mobile device. In some embodiments, a listing of tenants within the building 202 may be searchable on the mobile device 208.

In some embodiments, if a person simply boards an elevator car without requesting service, any number of controls may be invoked. For example, the person may be directed to exit the elevator car. If the person has previously registered for service, an application may be invoked on the person's mobile device 208 to request an input destination or tenant. If the person has previously registered for service, a default destination may be selected for the person. The default destination may be based on frequency of use or visits to the building 202 by the person. In some embodiments, the last tenant that a user visited may serve as a preferred destination or a default destination in the absence of input that selects a different tenant or destination.

In some embodiments, voice communications may be used. For example, when the server 206 detects that the mobile device 208 is within or proximate to the building 202 or elevator 204, the server may cause a telephone call to the placed to the mobile device 208. The user of the mobile device 208 may answer the telephone call and may search for or select a destination by speaking the name of the tenant. Based on the spoken name of the tenant, the server 206 may direct the user to a particular elevator 204 or elevator car 204-1, 204-2.

In some embodiments, once a user of the mobile device 208 has selected a tenant or destination, the server 206 may cause information (e.g., a web page, any uploaded announcements, coupons, or advertisements) to be provided to the mobile device 208. The user may consume (e.g., view) this targeted information while waiting for and traveling in the elevator 204.

In some embodiments, once a user of a mobile device 208 has selected a particular tenant within the building 202, the tenant may receive a notification that a person is in the building 202 to visit the tenant. The notification may include an indication of the identity of the user. Such a notification may allow the tenant (e.g., a receptionist of the tenant) to prepare to receive the person, such as by pulling-up the person's file, confirming that any outstanding balances have been paid by the person, preparing the person's favored drink, etc.

In some embodiments, once a user or an elevator car arrives at a particular destination or landing, the user may receive instructions or directions to the tenant's location. For example, such directions may be provided by the mobile device 208. Such directions may be useful where multiple tenants are located on a particular floor of a building.

Figure 3:
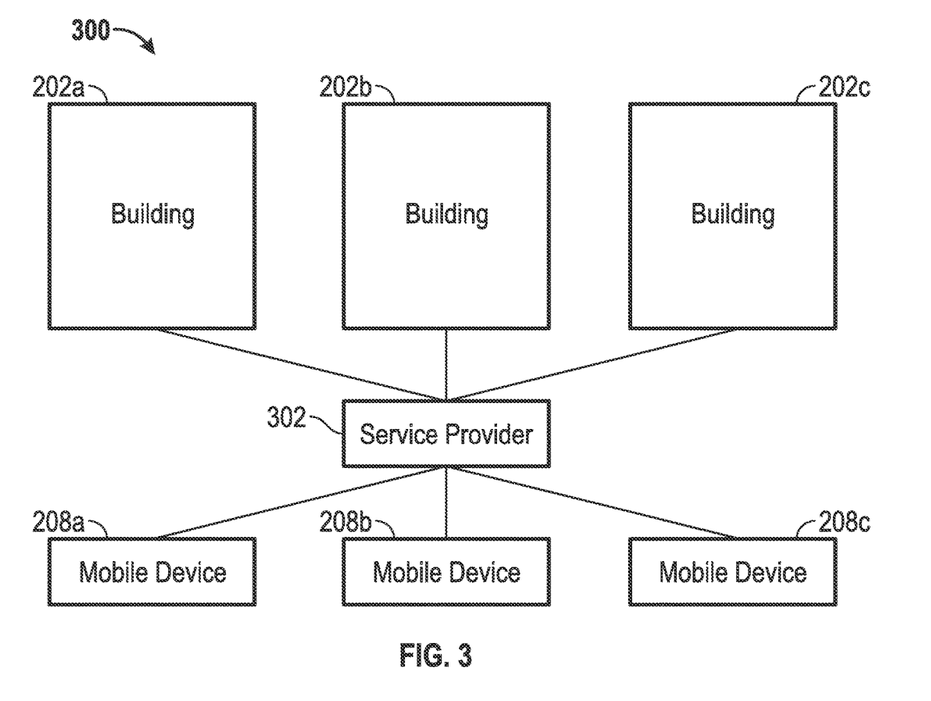
FIG. 3 illustrates an exemplary block diagram in accordance with one or more embodiments.

Turning now to FIG. 3, an exemplary block diagram 300 in accordance with one or more embodiments is shown. As shown one or more buildings, such as buildings 202a-202c may be registered with a service provider 302. One or more devices, such as mobile devices 208a-208c may be registered with the service provider 302. The service provider 302 may control the information or data that may be presented on the mobile devices 208a-208c, such as a listing of tenants. The service provider 302 may provide consistency across platforms or across the buildings 202a-202c, such that a user of a device (e.g., mobile device 208a) that visits two or three of the buildings 202a-202c is presented with a common interface when doing so. According to additional embodiments, the service may include an elevator provider's service that may use the user's information in conjunction with many different buildings that subscribe to the elevator provider's service, or that use elevators manufactured by the elevator provider. This may allow the user to receive the benefits of the system in buildings regardless of who owns the building. Further, the system may be capable of capturing user preferences based on user activity as well as user input. Accordingly, the more a user uses the system to assist in elevator travel, the more the system may learn about the user's preferences. This information may then be used to enhance the user's future service through services such as reordering options in the application, automatically calling elevator cars, automatically assigning the same elevator car to a user who frequently uses the same building, etc.

In some embodiments, some or all of the functionality or operations described above with respect to the server 206 may be performed by the service provider 302. The service provider 302 may include one or more computing devices, such as one or more servers.

Figure 4:
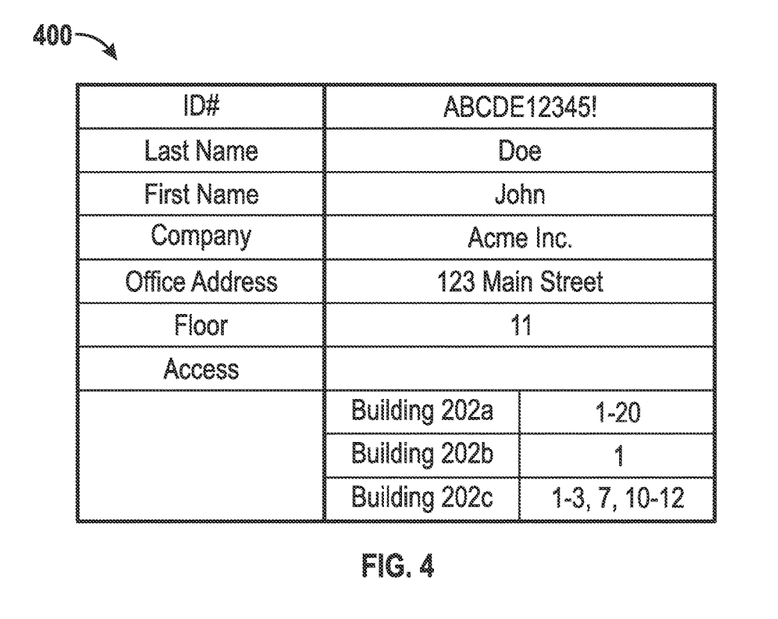
FIG. 4 illustrates a user or user device profile in accordance with one or more embodiments.

Turning now to FIG. 4, an exemplary profile 400 for a user of a device (e.g., mobile device 208) is shown. The profile may include a number of fields, such as ID#, Last Name, First Name, Company, Office Address, Floor, and Access as shown.

The ID# field may be an identifier that the service provider 302 allocates to the user. The ID# field may be any alphanumeric string or set of characters that may uniquely identify a user. Illustratively, the user ID# field is assigned a value of 'ABCDE12345!' in the profile 400.

The Last Name field may be the user's last name. Illustratively, the Last Name field is assigned a value of 'Doe' in the profile 400.

The First Name field may be the user's first name. Illustratively, the First Name field is assigned a value of 'John in the profile 400.

The Company field may correspond to an identification of an employer of the user. The Company field may represent an identification of a tenant that the user may visit. Illustratively, the Company field is assigned a value of 'Acme Inc.' in the profile 400.

The Office Address field may correspond to a street or mailing address for the entity identified by the Company field. Illustratively, the Office Address field is assigned a value of '123 Main Street' in the profile 400.

The Floor field may correspond to the floor of building identified by the Office Address field. Illustratively, the Floor field is assigned a value of '11' in the profile 400.

The Access field may be used to delineate access rights that the user has with respect to one or more buildings. Illustratively, the Access field is shown as being broken-down according to the buildings 202a-202c in the profile 400, and the user has access rights to floors numbered 1-20 in building 202a, floor number 1 in building 202b, and floors numbered 1-3, 7, and 10-12 in building 202c.

The profile 400 is illustrative. In some embodiments, one or more of the fields may be optional and different fields not shown may be included. The profile 400 may be established, tracked, or maintained by the service provider 302, by one or more of the buildings 202, etc.

Figure 5:
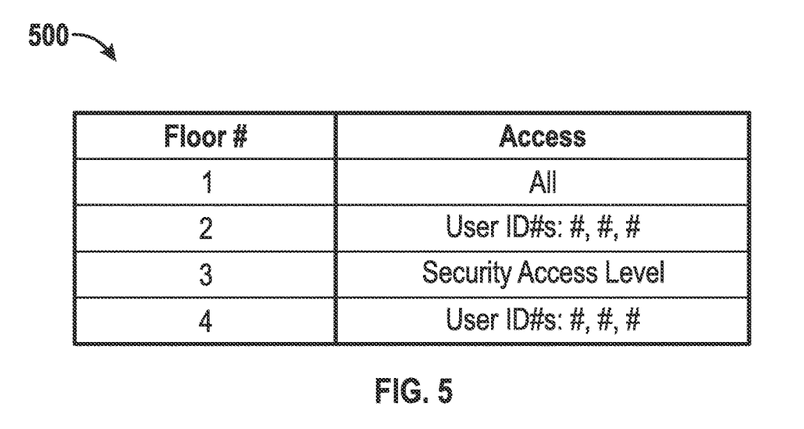
FIG. 5 illustrates a building profile in accordance with one or more embodiments.

Turning now to FIG. 5, an exemplary profile 500 for a building (e.g., building 202) is shown. The profile 500 may be organized in accordance with one or more parameters, such as tenants, floors, etc. Illustratively, the profile 500 is shown as being organized according to floor number.

As shown in FIG. 5, for a first floor access rights may be granted to all users. For example, the first floor may correspond to a lobby area for the building. Access to the second and fourth floor may be based on one or more user ID#'s (e.g., ID# field of FIG. 4). Access to the third floor may be based on a security access level. While only four floors are shown, the profile 500 may be expanded or contracted to accommodate a building with any number of floors, or any number of registered floors.

Figure 6:
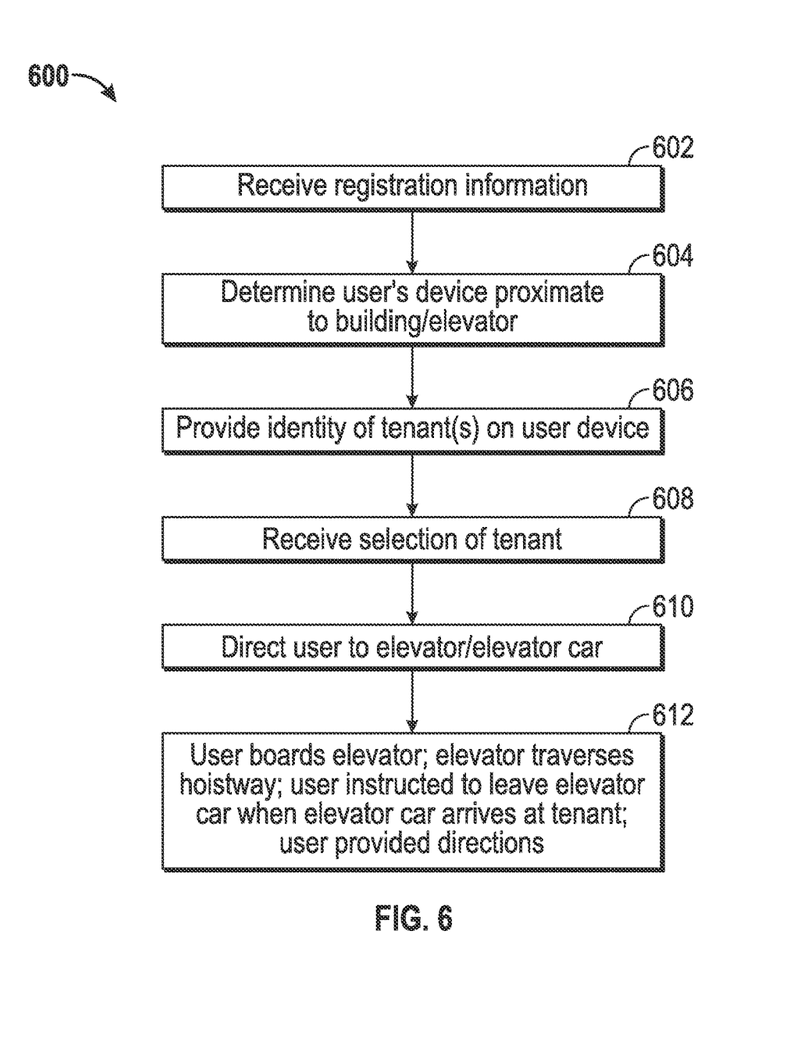
FIG. 6 illustrates a flow chart of an exemplary method in accordance with one or more embodiments.

FIG. 6 illustrates a method 600 that may be used in connection with one or more entities, devices or systems, such as those described herein. The method 600 may be used to control the operation of an elevator (e.g., elevator 204) based on an identification of one or more persons and one or more tenants.

In block 602, registration information may be received. The registration information may include information provided by a tenant of a building. The registration information may include information provided by a user of a device (e.g., mobile device 208). The registration information may include the information/data associated with the profiles 400 and 500. The registration information may be received at, or by, one or more entities, such as the service provider 302, the server 206, a kiosk associated with the server 206, the mobile device 208, etc.

In block 604, a determination may be made that the user's device is proximate to, e.g., the building 202 or the elevator 204.

In block 606, an identification of at least one of the tenants located in the building 202 may be provided on the user's device. The tenants may be presented on the user's device as a displayed listing, as an auditory message, or in any other format. The presentation of a particular tenant may be based on an identity of the user of the device.

In block 608, a selection of a tenant within the building 202 may be received. The received selection may be made from the tenants provided in block 606. In some embodiments, a default tenant may be used for the selection of block 608. For example, the default tenant may correspond to the last tenant in the building that the user of the device visited. In this regard, the user might not have to make an actual selection in block 608.

In block 610, the user of the device may be directed to a particular elevator (e.g., elevator 204) or elevator car (e.g., elevator car 204-1) based on the selection of block 608. The direction may be provided by the user's device. Dispatching operations may occur to summon the elevator car to the user's current floor/location.

In block 612, the user may board the elevator car. The elevator car may traverse the hoistway of the elevator to the floor of the building 202 where the tenant is located. Once the elevator car arrives at that floor, the elevator car and/or the user's device may indicate that the user has arrived at her destination and may signify the arrival by indicating the name of the tenant and/or instructing that the user should exit the elevator car (potentially referencing the user by name or ID#). In some embodiments, as part of block 612 the user may be provided directions from the location of the elevator car to the location of the tenant on the floor of the building in which the tenant is located. Such directions may be provided by the user device or any other device. The directions may be provided audibly, as a displayed message or graphic, etc.

The method 600 is illustrative. In some embodiments, one or more of the blocks or operations (or portions thereof) may be optional. In some embodiments, additional operations not shown may be included. In some embodiments, the operations may execute in an order or sequence different from what is shown.

While some of the examples described herein related to elevator systems, aspects of this disclosure may be applied in connection with other types of conveyance devices, such as a dumbwaiter, an escalator, a moving sidewalk, a wheelchair lift, etc.

Embodiments of the disclosure may be tied to one or more particular machines. For example, a user device (e.g., a mobile device) may provide identities of one or more tenants located in a building when the device is proximate to or located within the building. The tenants may register with a service, such that their identities may be presented by user devices. A user associated with a user device may select a tenant from the user device and an elevator car may be summoned to take the user to the tenant. The user device may direct the user to a particular elevator car.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:
receiving, by a computing device comprising a processor, registration information associated with a tenant of a building including tenant name and tenant floor and registration information associated with at least one user device;
determining, by the computing device, that the at least one user device is within a threshold distance of the building;
causing, by the computing device, the tenant name to be provided to the at least one user device based on the determination that the at least one user device is within the threshold distance of the building;
receiving, by the computing device, a selection of the tenant name; and
causing, by the computing device, an elevator car to be sent to a floor where the at least one user device is located for eventual travel to the tenant floor of the building in which the tenant is located;
wherein the tenant name is provided to the at least one user device based on the registration information associated with the at least one user device.

2. The method of claim 1, further comprising:
causing an indication of the elevator car to be provided by the at least one user device.

3. The method of claim 1, further comprising:
determining, by the computing device, that the at least one user device has entered the elevator car.

4. The method of claim 3, further comprising:
causing, by the computing device, doors of the elevator car to close based on determining that the at least one user device has entered the elevator car.

5. The method of claim 3, wherein when a user of the at least one user device has incorrectly entered a second elevator car:
reassigning, by the computing device, the second elevator car to the tenant floor.

6. The method of claim 1, wherein the selection of the at least one tenant is received by the at least one user device when the at least one user device is located in the elevator car.

7. The method of claim 1, further comprising:
initiating, by the computing device, a phone call to the at least one user device based on the determination that the at least one user device is within a threshold distance of the building,
wherein the selection of the at least one tenant is received as a voice command in response to the phone call.

8. The method of claim 1, further comprising:
causing, by the computing device, at least one of targeted information and a targeted advertisement to be provided by the at least one user device based on the selection of the at least one tenant.

9. The method of claim 1, further comprising:
causing, by the computing device, a notification that identifies that at least one user device to be transmitted to the at least one tenant based on the selection of the at least one tenant.

10. An apparatus comprising:
at least one processor; and
memory having instructions stored thereon that, when executed by the at least one processor, cause the apparatus to implement:
receiving registration information associated with a tenant of a building including tenant name and tenant floor and registration information associated with at least one user device;
determining that the at least one user device is within a threshold distance of the building;
causing the tenant name to be provided to the at least one user device based on the determination that the at least one user device is within the threshold distance of the building;
receiving a selection of the tenant name; and
causing an elevator car to be sent to a floor where the at least one user device is located for eventual travel to the tenant floor of the building in which the tenant is located;
wherein the tenant name is provided to the at least one user device based on the registration information associated with the at least one user device.

11. The apparatus of claim 10, wherein the the mobile device is determined to be within the threshold distance of the building based on GPS coordinates associated with the mobile device.

12. The apparatus of claim 10, wherein the instructions, when executed by the at least one processor, cause the apparatus to:
  transmit to the mobile device an indication that the elevator car has arrived at the tenant when the elevator car arrives at a floor of the building on which the tenant is located.

13. The apparatus of claim 12, wherein the indication comprises directions from the elevator car to a location of the tenant on the floor of the building.

* * * * *